US007591060B2

(12) United States Patent
Shalit

(10) Patent No.: US 7,591,060 B2
(45) Date of Patent: Sep. 22, 2009

(54) TRASH BAG REMOVAL SYSTEM

(75) Inventor: Michael Shalit, East Brunswick, NJ (US)

(73) Assignee: U-Needa Products, LLC, East Brunswick, NJ (US)

( * ) Notice: Subject to any disclaimer, the term of this patent is extended or adjusted under 35 U.S.C. 154(b) by 228 days.

(21) Appl. No.: 10/835,621

(22) Filed: Apr. 30, 2004

(65) Prior Publication Data

US 2004/0200843 A1 Oct. 14, 2004

Related U.S. Application Data

(62) Division of application No. 10/206,567, filed on Jul. 26, 2002, now Pat. No. 7,255,242.

(51) Int. Cl.
*B23P 19/00* (2006.01)

(52) U.S. Cl. ................................ 29/426.5; 220/495.06

(58) Field of Classification Search ............ 220/495.06, 220/908.1; 29/426.5
See application file for complete search history.

(56) References Cited

U.S. PATENT DOCUMENTS

| | | | | |
|---|---|---|---|---|
| 1,735,915 | A | 11/1929 | Bent | |
| 1,836,297 | A | 12/1931 | Vienna | |
| 3,063,591 | A | 11/1962 | Laginestra | |
| 3,545,644 | A | 12/1970 | Skokie et al. | |
| 4,140,257 | A * | 2/1979 | Peterson | 294/151 |
| 5,125,526 | A | 6/1992 | Sumanis | |
| 5,170,906 | A * | 12/1992 | Kochelek | 220/495.06 |
| 5,316,170 | A | 5/1994 | Brown | |
| 5,597,022 | A | 1/1997 | Reifers | |
| 5,598,942 | A * | 2/1997 | Cowie | 220/495.08 |
| 5,645,187 | A * | 7/1997 | Brown | 220/495.06 |
| 5,816,431 | A * | 10/1998 | Giannopoulos | 220/495.11 |
| 6,015,063 | A | 1/2000 | Poliquin | |
| 6,068,155 | A | 5/2000 | Sicherman | |
| 6,296,138 | B1 | 10/2001 | Hannah et al. | |
| 6,594,876 | B1 * | 7/2003 | Stastny | 29/401.1 |
| 2002/0190069 | A1 * | 12/2002 | Cuisinier | 220/495.11 |

* cited by examiner

*Primary Examiner*—David P Bryant
*Assistant Examiner*—Christopher M Koehler
(74) *Attorney, Agent, or Firm*—Lerner, David, Littenberg, Krumholz & Mentlik, LLP

(57) ABSTRACT

A trash bag removal system is disclosed. The system includes one or more flexible liners arranged within a trash can. An overfilled trash bag may force the liner against one or more of the internal walls of the trash can such that the liner will slide upwardly along the internal wall as the trash bag is removed.

12 Claims, 2 Drawing Sheets

TRASH BAG REMOVAL SYSTEM

CROSS REFERENCE TO RELATED APPLICATION

This application is a divisional of U.S. patent application Ser. No. 10/206,567, filed Jul. 26, 2002, the entire disclosure of which is hereby incorporated by reference.

BACKGROUND OF THE INVENTION

The present invention relates to the removal of trash bags from associated trash cans. More particularly, the present invention relates to a system and method of facilitating the removal of an overfilled, or filled trash bag from a trash can.

Overfilled or filled trash bags are difficult to remove from associated trash cans. This is due to forces exerted by the filled trash bag on one or more internal sidewalls of the trash can. Thus, a person who wishes to remove the overfilled trash bag will typically have substantial difficulties. In some instances, a single individual may not be able to remove the filled trash bag without assistance. Even when the trash bag can be removed, it is often difficult to do so as the associated trash can tends to lift off the ground upon attempted trash bag removal. Further, the force required to remove the trash bag may exceed its tensile strength, thus tearing the trash bag and spilling its contents.

Various devices have been created to help remove a trash bag from a trash can. However, all known trash bag removal devices have shortcomings—they either do not work well or are too complex. Thus, there remains a need for a simple and efficient device to facilitate the removal of a filled trash bag from a trash can. The present invention addresses that need.

SUMMARY OF THE INVENTION

The trash bag removal system of the present invention takes advantage of forces exerted from a filled trash bag to urge a flexible trash can liner against one or more internal walls of an associated trash can such that the liner will slide upwardly along the walls as the trash bag is removed. In essence, the invention uses a trash can liner to reduce frictional forces that would otherwise be applied between the trash bag and the walls of the trash can to permit easy removal of a trash bag. Thus, use of the trash can liner of the present invention will substantially aid in the removal of a filled trash bag from an associated trash can.

In one embodiment of the present invention, a trash bag removal system is provided. The system comprises at least one flexible trash can liner having first and second ends. When a single trash can liner is used, such liner may be arranged within a trash can having a top rim and at least one internal side wall. The trash can liner may be positioned within the trash can adjacent the side wall so as to form opposing first and second sides terminating at the corresponding first and second ends where both of the ends extend toward the top rim of the trash can. When a trash bag is at least partially filled within the trash can, forces will be exerted on the opposing sides of the trash can liner and the associated side walls of the trash can such that the first and second ends of the trash can liner will slide upwardly along the corresponding side walls upon removal of the trash bag from the trash can.

In a preferred embodiment, the flexible liner may be made of a polymeric material.

The trash can liner may have a total length between its first and second ends of at least 25 percent of the height of an associated trash bag within the trash can. In alternate embodiments, the length of the trash can liner may be any length provided that it effectively facilitates removal of an associated trash bag from a trash can. In an alternate embodiment, the trash can liner may have a total length of at least 50 percent of the height of an associated trash bag. In yet another embodiment, the trash can liner may have a total length of at least 100 percent of the height of an associated trash bag.

The trash bag removal system may also comprise a trash can in combination with a flexible trash can liner having the features discussed above.

In yet another preferred embodiment, the trash bag removal system may comprise a plurality of flexible trash can liners optionally, each flexible liner may have at least one fold. In another preferred embodiment, each of the flexible trash can liners may have two or more folds. The folds may form living hinges.

The above features and advantages of the present invention will be better appreciated when considered in view of the following description of the present invention and associated drawings.

DETAILED DESCRIPTION

A preferred embodiment of the present trash bag removal system is shown in FIGS. 1-5. The present invention provides a simple and effective way of removing a substantially filled trash bag 18 from an associated trash can 2. The trash can 2 shown in FIGS. 1-5 has a substantially cylindrical configuration. However, such a cylindrical configuration is by way of example only. In alternate embodiments of the present invention, the trash can may have any one of numerous conventional and unconventional geometric configurations, such as elliptical, cubical, etc.

Figure 1:
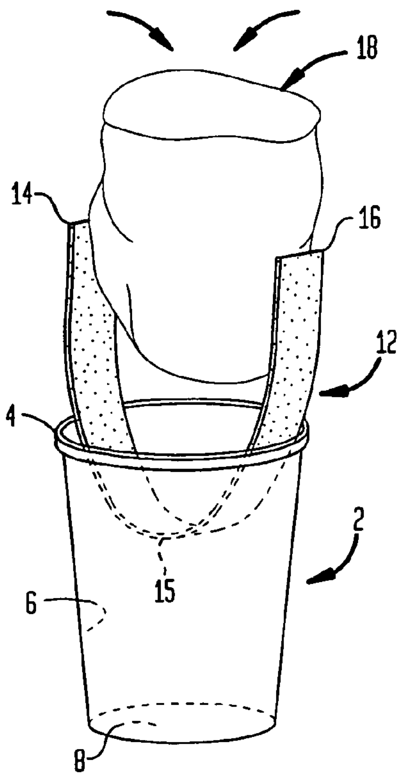
FIG. 1 is an exploded view of one embodiment of the trash bag removal system of the present invention.
Figure 2:
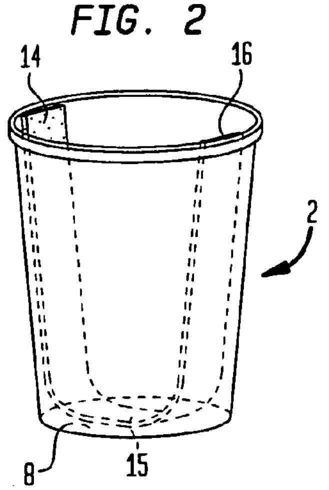
FIG. 2 is a front view of the trash bag removal system with the trash can liner is in a fully seated position.

For illustrative purposes, FIG. 1 shows an exploded view of the trash bag removal system. The trash can 2 includes at least one inner wall 6 and a bottom wall 8. In the case of the cylindrical trash can shown in FIGS. 1-5, the inner wall 6 is continuous and thus, may be considered a single inner wall. In alternate embodiments where the trash can 2 has a cubical (or other) configuration, each side of the inner wall may be considered a separate inner wall.

The trash can 2 includes a top rim, which defines an open area through which an associated trash bag 18 and flexible trash can liner 12 may be inserted and removed. A significant aspect of the present invention relates to the flexible trash can liner 12, which may be made of any flexible material, preferably a polymeric material such as plastic, vinyl or the like. However, trash can liner 12 can also be made of non-polymeric woven and non-woven materials. The arrangement of trash can liner 12 within a trash can along with an associated trash bag will facilitate the removal of the trash bag as discussed further below.

The trash can liner 12 is preferably an elongate relatively thin sheet of flexible material. As illustrated in FIG. 1, the trash can liner 12 has a first end 14, a second end 16, and a central portion 15 therebetween.

In one preferred embodiment of the present invention, shown in FIGS. 1-5, a single trash can liner 12 may be used to facilitate removal of an associated overfilled trash bag 18 from a trash can 2. In alternate embodiments of the present invention, two or more trash can liners may be arranged within an associated trash can to facilitate removal of a substantially overfilled trash bag therefrom.

The trash bag removal system of the present invention functions to reduce frictional forces between a filled trash bag 18 and associated trash can 2 as the trash bag 18 is being removed from the can. It is known that the greater the amount of trash placed within a trash bag 18, the greater the forces become that are exerted on the internal wall 6 of trash can 2. In order to overcome the problems discussed above in removing a filled trash bag from an associated trash can, it is preferable to place the flexible liner 12 into trash can 2 as illustrated in FIGS. 1-5. In a preferred embodiment, the flexible liner 12 is relatively narrow and, when arranged in an assembled position within trash can 2, extends along at least a portion of opposing sides of an associated trash bag 18.

Figure 3:
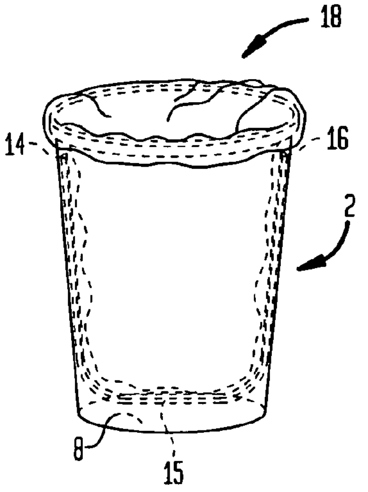
FIG. 3 is a front view of the trash bag removal system of FIG. 2 with an empty trash bag shown in an associated trash can along with the flexible insert of the present invention.

FIG. 3 illustrates the trash bag removal system where the flexible liner 12 is arranged in its fully assembled and at rest position before the associated trash bag 18 is overfilled. In this state, there are substantially no forces, or relatively small force vectors, exerted by the trash bag 18 on the internal side wall 6 of the trash can 2. In the embodiment shown, first and second ends 14 and 16 of the flexible liner 12 extend along opposite sides of the trash can 2 toward the top rim 4 thereof. The distance that the ends 14 and 16 extend below or above the rim 4 may vary in alternate embodiments of the present invention. The central portion 15 of the flexible liner 12 may rest adjacent the bottom surface 8 of the trash can 2. In alternate embodiments, the central portion 15 may be raised above the bottom portion 8.

Figure 4:
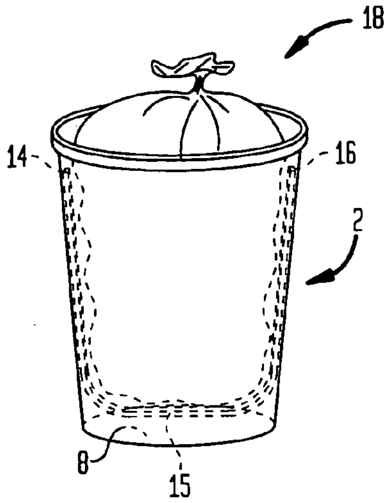
FIG. 4 is a front view of the present trash bag removal system with the associated trash bag in an overfilled condition.

FIG. 4 illustrates the present trash bag removal system when associated trash bag 18 is in an overfilled state. In such a state, relatively large forces are exerted outwardly from the trash bag 18 against the internal sidewall 6 of the trash can 2. Such forces effectively urge the opposing sides of the flexible liner 12 against the internal sidewall 6 of the trash can 2.

Figure 5:
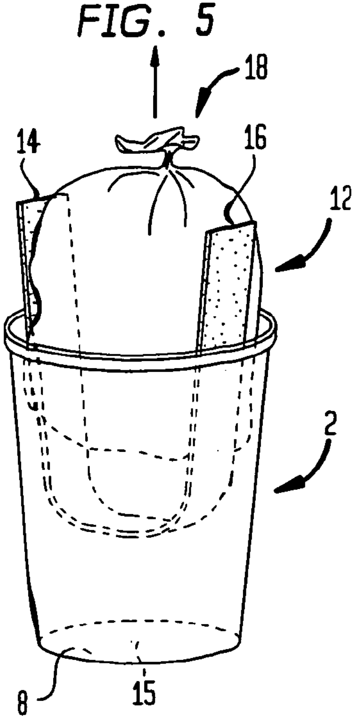
FIG. 5 is a front view of the trash bag removal system of FIG. 4 with the overfilled trash bag in a partially removed position.

An advantage of the present invention is realized when a person begins removing an overfilled trash bag 18 from an associated trash can 2 as illustrated in FIG. 5. This advantage occurs as the flexible liner 12 substantially reduces frictional forces, which would otherwise exist, as the trash bag 18 is pulled upwardly through the open rim 4 at the top of the trash can 2. Under certain conditions, removal of an overfilled trash bag 18 will cause the flexible liner 12 to slide upwardly along with the trash bag. Opposing ends 14 and 16 of the flexible liner 12 may thus slide out of the open top defined by the rim 4 of the trash can as the trash bag 18 is also removed.

In most circumstances, as the trash bag 18 is removed from the associated trash can 2, the flexible liner 12 will slide (or fall) back into the associated trash can as the forces previously existing between the overfilled trash bag 18 and the internal wall 6 of the trash can 2 no longer exist. Thus, by reducing the frictional forces, which would otherwise exist, the trash bag removal system of the present invention is highly effective at facilitating removal of an overfilled trash bag from an associated trash can.

Figure 6:
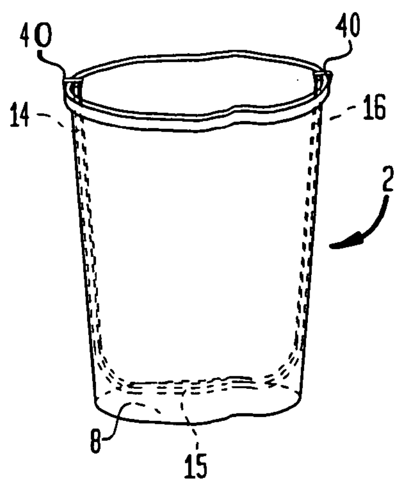
FIG. 6 is a front view of an alternate embodiment of the present invention.

In alternate embodiments of the present invention, one or both ends 14 and 16 of flexible liner 12 may be secured near the top portion of an associated trash can. This may be accomplished through the use of clips 40 or the like. An example of an embodiment of the present invention using such clips is illustrated in FIG. 6.

Figure 7:
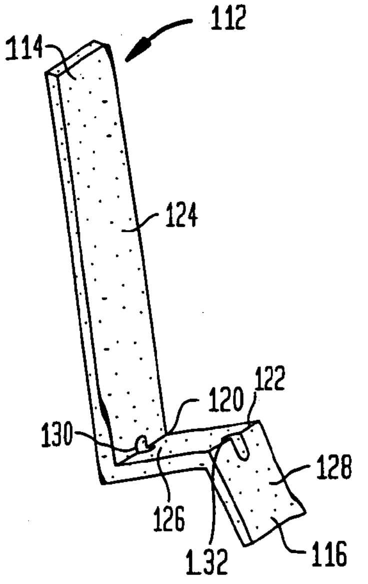
FIG. 7 is a perspective view of a portion of a trash bag removal system in accordance with an alternate embodiment of the present invention.
Figure 8:
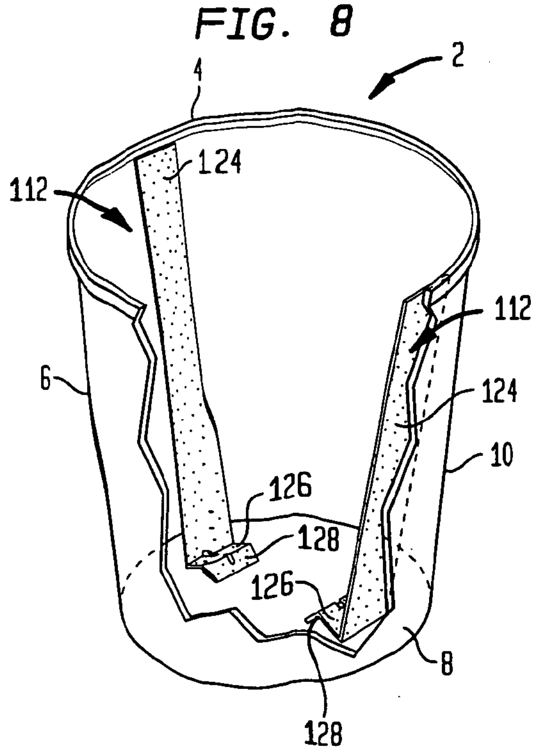
FIG. 8 is a schematic view of the trash bag removal system of FIG. 7 arranged within a trash can.

FIGS. 7 and 8 depict yet another embodiment of the present invention. In this embodiment, two flexible liners 112 are used. In alternate embodiments, more than two flexible inserts may utilized.

As with the embodiment shown in FIGS. 1-5, flexible liners 112 may be made of a polymeric, woven or other non-woven material selected to reduce frictional forces between an overfilled trash bag and an associated trash can.

In the dual liner embodiments shown in FIGS. 7 and 8, it is preferable to arrange the two flexible liners 112 within a trash can 2 at opposing sides of the internal wall 6.

Each of the flexible liners 112 have first and second ends. One end 114 is arranged near the rim 4 of the associated trash can. This may be considered the top end of the flexible liners when they are in assembled position. The other end 116 may be arranged adjacent to the bottom wall 8 of the trash can.

An optional feature of the flexible liner 112 is that a pair of hinges 20 and 22 may be arranged near the second end 116. As shown in FIG. 7, the hinges 120 and 122 may define three separate areas of the flexible insert 112—a first section 124, a second section 126 and a third section 128. The first section 124 extends from the first end 114 to the hinge 120. The second portion 126 extends between the hinges 120 and 122. Finally, the third section 128 extends between the hinge 122 and the second end 116.

As illustrated in FIG. 8, when the two flexible liners 112 are arranged within a trash can 2, the corresponding first section 124 is typically the longest section. The length of the first section 124 may extend along a substantial portion of the height of the trash can defined between the top rim 4 and the bottom wall 8.

The corresponding second section 126 and third section 128 may be shorter than the first section 124.

In a preferred embodiment, where the flexible liner 112 is made of a single piece of polymeric material, the hinges 120 and 122 may be living hinges, which are formed by either creasing, crimping, folding, notching or otherwise manipulating the polymeric material in a manner which is known by those skilled in the hinge art.

As shown in FIGS. 7 and 8, each of the flexible liners 112 may have slots 130 and 132 arranged at hinges 120 and 122, respectively. The slots 130 and 132 are optional features of the present invention. They may facilitate removal of a filled trash bag as they allow air flow through the flexible liner 112. Alternatively, the flexible liner 112 may be crimped along its edges in order to allow air to escape releasing any suction that may develop along the length thereof.

When a person wishes to remove an overfilled trash bag from a trash can employing the use of flexible liners 112, the trash bag would be removed in the same way as discussed above in connection with the embodiment of FIGS. 1-5. That is, if the forces exerted by the overfilled trash bag 18 on the internal side wall 6 of the trash can 2 are such that it would ordinarily make it difficult to remove the trash bag 18, the pair of flexible liners 112 will slide upwardly as the associated trash bag 18 is being pulled upwardly out the trash can 2. Thus, the flexible liners 112 will substantially reduce frictional forces and will thereby facilitate easy removal of the overfilled trash bag 18 from the trash can 2.

When the overfilled trash bag 18 is removed to a point where there are no longer substantial forces exerted between the overfilled trash bag 18 and the internal side wall 6 of the trash can 2, the flexible liners 112 may fall back within the trash can 2.

In the event that the flexible liners 112 are pulled entirely out of the associated trash can 2 upon removal of an overfilled trash bag 18, the user can simply place them back into their intended assembled position within the trash can 2 through the top rim 4.

As with the embodiment disclosed in FIG. 6, clips 40 may optionally be used to secure the top portion of flexible liners 112 in assembled position within a trash bag. However, clips 40 are not necessary, and in certain embodiments may not be desirable.

The length of the flexible liners 12 and 112 may vary greatly in alternate embodiments of the present invention. For example, in one embodiment, the flexible liner may have a length less than 25 percent of the height of a trash bag (i.e., from the top to the bottom of the bag) when arranged in an associated trash can. In another embodiment, the overall length of the subject flexible liners may be at least 25 percent of the height of an associated trash bag. In yet another embodiment, the flexible liners may have an overall length of at least 50 percent of the height of an associated trash bag. In yet another embodiment, the flexible liners may have a length of at least 100 percent of the height of an associated trash bag.

It should be appreciated that various modifications to the trash bag removal system, and accompanying method, disclosed herein can be made while remaining within the scope of the present invention. Indeed, such modifications are encouraged to be made to the features of the disclosed trash bag removal system and the steps of the accompanying method while remaining within the scope of the claims set forth below.

What is claimed is:

1. A method of facilitating the removal of a trash bag from a trash can having an outer wall, a bottom wall, and a top opening, the method comprising:

(a) arranging a flexible liner having a first end, a second end, and a length therebetween within the trash can such that a portion of the length of the liner is positioned adjacent the bottom wall and the first and second ends are disposed below the top opening;

(b) arranging the trash bag within the trash can so that the flexible liner is between the trash bag and an inner wall of the trash can such that the first end and the second end are not directly in contact with each other; and (c) when the trash bag within the trash can is filled with a desired amount of trash, pulling on the trash bag so as to remove the same from the trash can, in which during removal of the trash bag, the flexible liner slides upwardly along the inner wall of trash can so as to reduce friction between the trash bag and the inner wall of the trash can to thus facilitate removal of the trash bag from the trash can, and in which during said removal of the trash bag the first end and the second end are not directly in contact with each other.

2. The method of claim 1, further comprising arranging a plurality of flexible liners within the trash can between portions of the inner wall thereof and the trash bag.

3. The method of claim 1, wherein the flexible liner remains at least partially within the trash can when the trash bag is fully removed.

4. The method of claim 2, wherein the flexible liners remain at least partially within the trash can when the trash bag is fully removed.

5. The method of claim 1, further comprising the step of removing the filled trash bag from the trash can by pulling upward directly on the trash bag itself so that the flexible liner remains at least partially within the trash can upon complete removal of the filled trash bag.

6. The method of claim 1, wherein the flexible liner is arranged within the trash can such that the flexible liner covers less than an entire inside portion of the trash can.

7. A method of facilitating the removal of a trash bag from a trash can having an outer wall, a bottom wall, and a top opening, the method comprising:

(a) arranging a plurality of flexible liners each having a first end, a second end, and a length therebetween within the trash can such that portions of the lengths of the liners are positioned adjacent the bottom wall and the first and second ends are disposed below the top opening;

(b) arranging the trash bag within the trash can so that the flexible liners are between the trash bag and an inner wall of the trash can and;

(c) when the trash bag within the trash can is filled with a desired amount of trash, pulling the trash bag out of the trash can such that the flexible liners slide upwardly along the inner wall of trash can so as to reduce friction between the trash bag and the inner wall of the trash can to thus facilitate removal of the trash bag from the trash can, wherein at least one of the flexible liners remains at least partially within the trash can when the trash bag is fully removed.

8. The method of claim 7, further comprising the step of removing the filled trash bag from the trash can by pulling upward directly on the trash bag itself so that at least one of the flexible liners remains at least partially within the trash can upon complete removal of the filled trash bag.

9. The method of claim 7, wherein the flexible liners are arranged within the trash can such that the flexible liners cover less than an entire inside portion of the trash can.

10. A method of facilitating the removal of a trash bag from a trash can having an outer wall, a bottom wall, and a top opening, the method comprising:

(a) arranging a plurality of flexible liners each having a first end, a second end, and a length therebeween within the trash can such that portions of the lengths of the liners are position adjacent the bottom wall, the first and second ends are disposed below the top opening, and the flexible liners cover less than an entire inside portion of the trash can;

(b) arranging the trash bag within the trash can so that the flexible liners are between the trash bag and an inner wall of the trash can; and (c) when the trash bag within the trash can is filled with a desired amount of trash, pulling the trash bag out of the trash can such that the flexible liners slide upwardly along the inner wall of trash can so as to reduce friction between the trash bag and the inner wall of the trash can to thus facilitate removal of the trash bag from the trash can, wherein at least one of the flexible liners remains at least partially within the trash can when the trash bag is fully removed.

11. The method of claim 10 further comprising the step of removing the filled trash bag from the trash can by pulling upward directly on the trash bag itself so that at least one of the flexible liners remains at least partially within the trash can upon complete removal of the filled trash bag.

12. The method of claim 10, wherein the flexible liners are arranged within the trash can without affixing the flexible liners to each other.

* * * * *